2 Sheets—Sheet 1.

A. Q. ROSS.
Gas-Retort Discharging Apparatus.

No. 222,564. Patented Dec. 9, 1879.

Attest,
W. H. H. Knight
W. Blackstock

Inventor,
Abbott Q. Ross,
By L. Hill,
His Atty.

A. Q. ROSS.
Gas-Retort Discharging Apparatus.

No. 222,564. Patented Dec. 9, 1879.

Attest,
W. H. H. Knight,
W. Blackstock.

Inventor,
Abbott Q. Ross.
By L. Hill,
His Atty.

UNITED STATES PATENT OFFICE.

ABBOTT Q. ROSS, OF CINCINNATI, OHIO.

IMPROVEMENT IN GAS-RETORT DISCHARGING APPARATUS.

Specification forming part of Letters Patent No. 222,564, dated December 9, 1879; application filed July 31, 1879.

*To all whom it may concern:*

Be it known that I, ABBOTT Q. ROSS, of Cincinnati, Hamilton county, Ohio, have invented certain new and useful Improvements in Gas-Retort Discharging Apparatus; and I do hereby declare the following to be a full, clear, and exact description of the same, reference being had to the accompanying drawings, forming part of this specification, in which—

Figure 1:
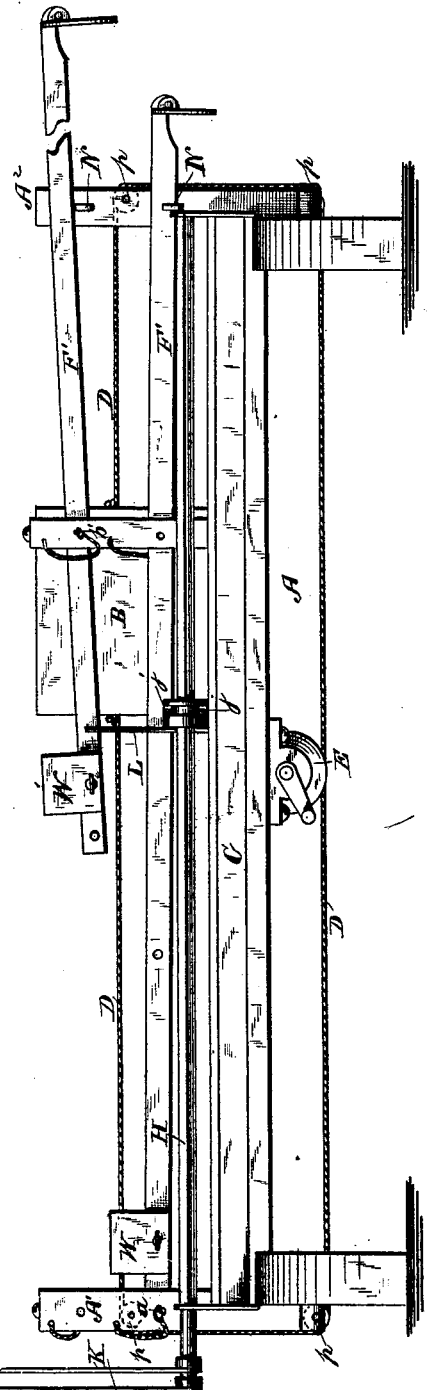
Figure 2:
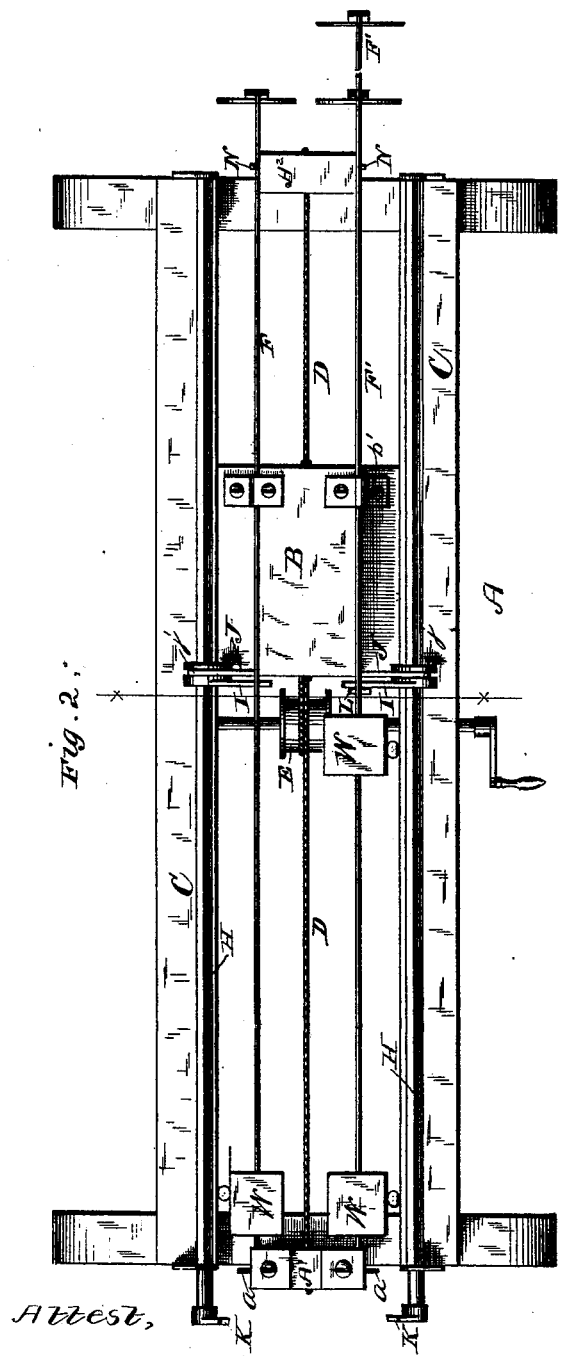
Figure 3:
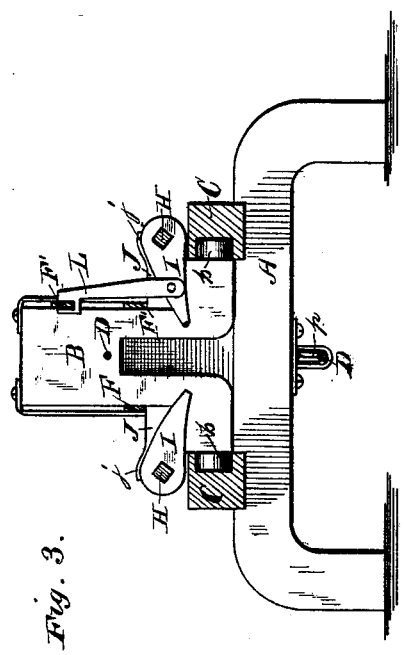

Figure 1 is a side elevation of my improved machine, showing one of the rakes partially extended. Fig. 2 is a top-plan view of the same; and Fig. 3 is a cross-section in the line $x\ x$, Fig. 2.

Similar letters of reference in the several figures denote the same parts.

This invention relates to that class of gas-retort dischargers in which the coke is drawn from the retorts by means of one or more rakes connected to a reciprocating traveler; and it has for its object to improve the construction of such machines by reducing the number of working parts to a minimum and perfecting the various adjustments which are necessary to their perfect operation.

To this end the invention consists in the combination, with a reciprocating traveler, of two rakes or series of rakes located on opposite sides of the traveler, devices for connecting either of said rakes or series of rakes to the traveler when desired, and devices for connecting either of said rakes or series of rakes to a stationary part of the machine when desired, whereby either of the rakes or series of rakes may be thrown into operation while the rest remain idle and are cooling, substantially as described.

It further consists in the employment of a rake or rakes pivoted to and wholly supported by the reciprocating traveler, having their outer ends which carry the rake-heads held normally elevated by yielding pressure, whereby the rake-heads are enabled to automatically adjust themselves to the irregularities of the upper surfaces of the interior of the retorts.

It further consists in combining with a reciprocating traveler and a rake or rakes pivoted thereto a crank or lever moving with the traveler and a longitudinal oscillating bar by which the crank or lever can be operated to raise and lower the rake or rakes at any part of their stroke.

It further consists in combining with the oscillating operating-bar and the crank or lever mounted thereon a bracket connected to the traveler, by which the crank or lever is made to slide along the oscillating bar as the traveler is moved back and forth, and by which also said oscillating bar is supported at the point of greatest strain and prevented from bending.

In the accompanying drawings, A represents the main frame of the machine, carrying the various operating parts, and preferably supported upon wheels or rollers, by which it is adapted to be moved back and forth in front of the retorts by hand or by some convenient motor, such, for instance, as a small oscillating engine.

The traveler B is mounted upon small wheels $b\ b$, adapted to work in guiding-grooves in the parts C C of the frame, and it is caused to move back and forth upon the machine by means of wire ropes or chains D D, connected to it at opposite ends, and which, after passing over grooved guiding pulleys or sheaves $p\ p$ on the end uprights, $A'\ A^2$, are secured to an actuating-drum, E, or any equivalent thereof.

F F' are two series of rakes arranged on opposite sides of the traveler and capable of being connected to, or disconnected from, the traveler, so as to be projected into the retort, or remain idle when the traveler is advanced.

Each rake is independent of the other rakes in the same series, and also of the rakes in the series on the opposite side of the traveler.

When not in operation the rakes are secured to the rear upright, A', by means of pins $a$ or other suitable fastenings; but when they are in operation they are detached from said rear upright and connected by pins $b'$, or equivalent devices, to the side of the traveler, as shown in Fig. 1.

In drawing the coke from a large number of retorts with machines of this class the rakes get heated so as to render them inoperative, and it becomes necessary to arrest the operation of the machine in order to allow sufficient time for them to cool. This, of course, involves a great loss of time and impedes materially the progress of the work.

It is found impracticable to remove the rakes from the machine and substitute others in their stead, because their heat renders it difficult to handle them, and, besides, they are cumbrous and heavy.

In my present machine I have overcome this difficulty by the employment of two series of rakes in connection with a common traveler, whereby I am enabled to keep the machine in constant operation without stopping for cooling the rakes, or while fixing one or more disabled rakes.

When all of one series or gang of rakes are employed to discharge several retorts simultaneously they are connected to and move back and forth with the traveler, while the other and opposite series are secured to a rigid portion of the frame and held stationary. The rakes in each series when in operation are held in the same position as that in which the corresponding rakes in the opposite series are held when they are in operation, so that the outer ends carrying the rake-heads will be normally at the same height, no matter which series is in use.

I regard this part of my invention of great practical importance, as it enables me to uninterruptedly discharge a large number of retorts in a very short space of time without having to stop for the cooling of the rakes or immediately attending to a disabled rake.

Each of the rakes, when in operation, is pivoted to and wholly supported by the traveler, as before described, and its outer or forward end, which carries the rake-head, is held normally in elevated position by means of a weight, W, hung to the inner end of the rake back of its pivot, or by a downwardly-acting spring applied at said point, or an upwardly-acting spring applied in front of the pivot, it being only essential that some device be employed by which the outer end is held elevated by a yielding pressure, in order that, as the rake-head enters the retort, it will bear against the top surface thereof and adapt itself automatically to any inequalities or irregularities of said top surface.

As another equivalent of the weight W, the rake itself might be extended back of its pivot sufficiently far to effect the elevation of the forward end.

For effecting the depression of the outer ends of the rakes to cause the rake-heads to enter the coke for the purpose of withdrawing the latter, I employ longitudinal oscillating bars H H, one alongside of each series of rakes, and mount upon each of said bars a crank or arm, I, in such manner that, while said crank can slide longitudinally on said bar, it will be vibrated up and down whenever the bar is oscillated on its axis. This manner of construction may be accomplished by constructing the bar angular in cross-section and making the opening in the lever or crank of similar shape, or by forming a feather or spline on a round bar and a groove in the lever or crank, as will be readily understood.

The crank or arm is provided with a hub having a peripheral groove, in which fit the bifurcated arms $j\ j$ of a bracket, J, secured to the body of the traveler. By this arrangement the crank or lever is carried back and forth with the traveler in its movements and caused to slide longitudinally on the oscillating bar. The outer end of the crank or lever I is located beneath the inner end of the lower rake, back of its pivot, and, when the bar H is oscillated by a hand-lever, K, grasped by the operator, the crank is raised, and, striking the rake, causes its outer or forward end to be depressed. The rakes in the series above the lower one are also operated from the crank through a jointed arm, L, or other equivalent arrangement.

The crank, instead of operating to merely positively depress the outer ends of the rakes, and then allow them to be automatically raised, as before described, may, if preferred, be positively connected to the inner ends of the rakes, so as to both positively raise and depress the outer ends, as will be apparent.

The bracket J not only connects the crank with the traveler, but offers a support for the bar H at the point at which it is subjected to the greatest amount of strain.

It is sometimes desirable to employ but one rake at a time, and to disconnect the others from the traveler and secure them to the rear upright, A′, of the frame. For instance, the upper rake of the series only may be required for use. If the connections of the lower rakes were made to the upright A′ while they lie in a horizontal position, it would be necessary, in adjusting the upper operating-rake, to lift all of the rakes, and, since the pivots of said lower or idle rakes would be at their ends, it would be more difficult to raise them. When, therefore, it is desired to disconnect, say, the lower rake, the traveler is moved back to the limit of its stroke, and the pivot-pin by which the rake is connected to the traveler removed. The rake then drops into a horizontal position, its forward end being supported by a bracket, N, on the forward upright, $A^2$. The operating-lever is then moved, so as to raise the crank and lift the inner weighted end of the rake, so that it can be connected higher up on the upright A′. In this position the lower rake is so held that the crank will not engage with it in operating the other rakes until the traveler is moved so far forward that the raising of the rake will not be attended with much disadvantage by reason of the power being applied so far from the pivot.

When it becomes necessary to remove the deposit of carbon which collects on the interior surface of the retorts, the rake-heads can be taken off and rigid scrapers attached to the rakes in their places. The scrapers are then run into the retort and moved back and forth until the deposit is cleared away.

It is proper here to remark that the machine herein shown and described is not the first in which a single gang of rakes are employed, and in which each rake is provided with devices whereby it can be connected to the movable traveler or to a stationary part of the machine, as desired, such arrangement being shown and described in an application for Letters Patent of the United States filed by me July 1, 1879; but it is the first, so far as I am aware, to employ two rakes or series of rakes arranged on opposite sides of a common traveler, and each rake provided with connecting devices of the character above mentioned, whereby the opposite rakes or series of rakes are enabled to be employed alternately, and thus allow one set of rakes to be put in operation while the other set is cooling, though still in the machine, and in proper position for immediate attachment without handling.

The patent granted me February 25, 1879, No. 212,569, shows rakes which can be shifted to opposite sides of the traveler; but there is no reference therein to the employment of an independent series of rakes on each side of the traveler, nor any means shown or described for connecting the rakes of either such series to a stationary portion of the machine, so that one series could remain idle while the other was in operation. These references to prior machines, it is believed, will assist in comprehending the nature of the present improvements.

Having thus described my invention, I claim as new—

1. In a gas-retort discharger, the combination, with a reciprocating traveler, of two rakes or series of rakes located on opposite sides of the traveler, devices for connecting either of said rakes or series of rakes to the traveler when desired, and devices for connecting either of said rakes or series of rakes to a stationary part of the machine when desired, whereby either of the rakes or series of rakes may be thrown into operation while the rest remain idle and are cooling, substantially as described.

2. In a gas-retort discharger, the combination, with a reciprocating traveler, of a rake pivoted to and wholly supported by said traveler and means for holding the outer end of the rake normally elevated by a yielding pressure, substantially as described, for the purpose specified.

3. In a gas-retort discharger, the combination, with a reciprocating traveler having a rake or series of rakes pivoted thereto, of a crank or lever, I, moving with said traveler, and a longitudinal oscillating bar, H, by which said crank or lever can be operated to raise and lower the rake or rakes at any part of their stroke, substantially as described.

4. The combination, with the oscillating bar and the crank or lever mounted thereon, of the bracket secured to the traveler, by which the said crank or lever is made to slide along the oscillating bar as the traveler is moved back and forth, and by which, also, said oscillating bar is supported at the point of the greatest strain upon it, substantially as described.

ABBOTT Q. ROSS.

Witnesses:
WM. BLACKSTOCK,
M. CHURCH.